July 31, 1956     A. N. IKNAYAN ET AL     2,756,801

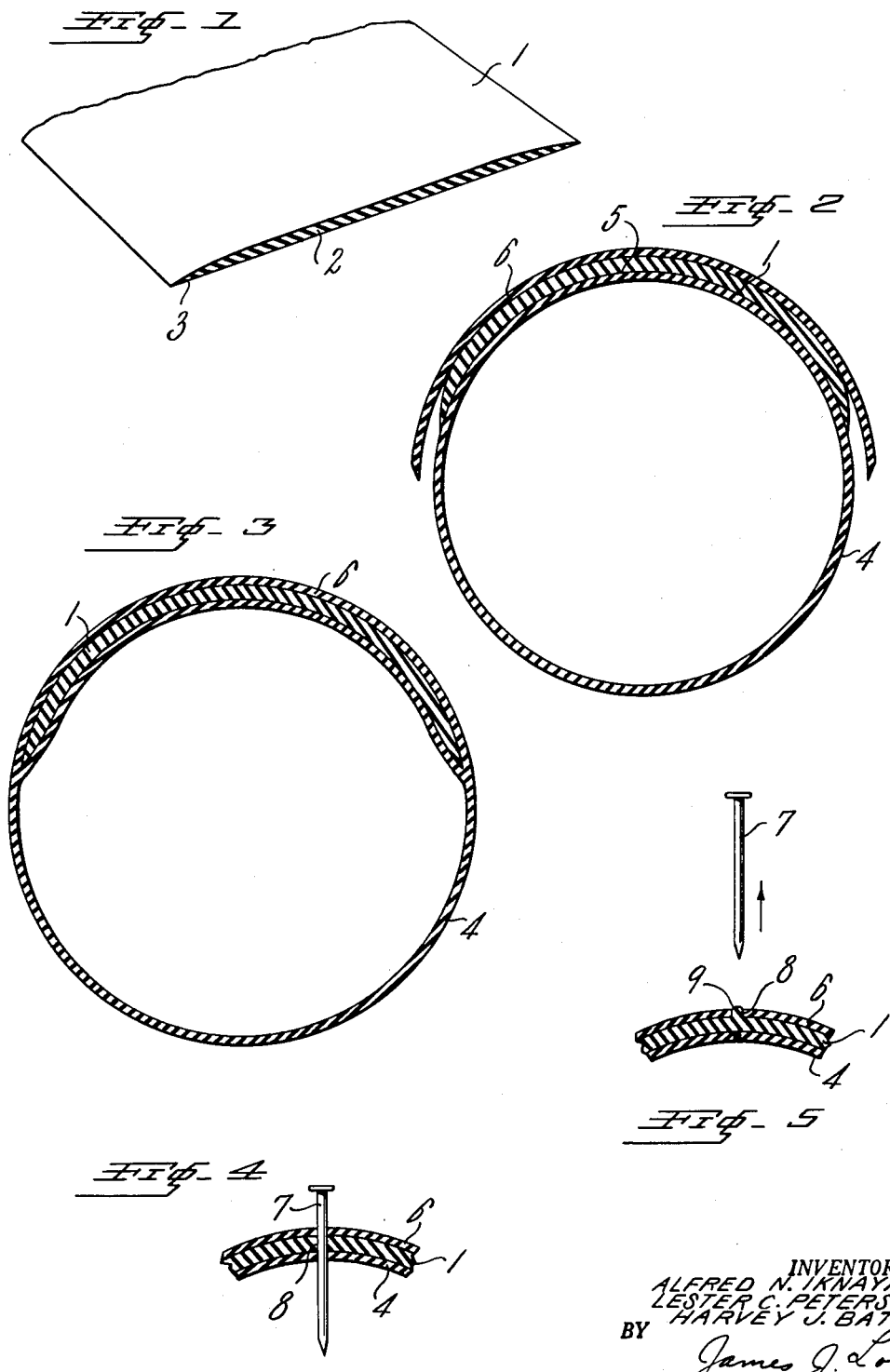

PUNCTURE-SEALING PNEUMATIC ARTICLE

Filed Oct. 20, 1952     2 Sheets-Sheet 2

INVENTORS
ALFRED N. IKNAYAN
LESTER C. PETERSON
HARVEY J. BATTS
BY James J. Long
AGENT

United States Patent Office 2,756,801
Patented July 31, 1956

2,756,801

PUNCTURE-SEALING PNEUMATIC ARTICLE

Alfred N. Iknayan, Grosse Pointe Farms, Mich., and Lester C. Peterson and Harvey J. Batts, Indianapolis, Ind., assignors to United States Rubber Company, New York, N. Y., a corporation of New Jersey Application October 20, 1952, Serial No. 315,722

2 Claims. (Cl. 152—347)

This invention relates to an improved plastic puncture-sealing structure incorporated in a pneumatic tire casing or inner tube, as well as to an improved method of making a puncture-sealing structure.

It has been proposed to render a pneumatic tire, or an inner tube, self-sealing, by providing within the tire or inner tube a layer of plastic material, which would serve to seal any punctures made in the tire or tube. However, the plastic sealant materials used for this purpose have had certain deficiencies. Thus, the sealant materials have been subject to undue plastic flow, with the result that under the influence of centrifugal forces developed when the tire is running, and under the influence of elevated operating temperatures, the sealant tends to flow or migrate to the crown of the tire, leaving the side portions unprotected. Also, such flow causes the sealant to collect in irregular lumps, thereby throwing the tire very much out of balance.

Another requirement of the sealant layer is that it should maintain the desired degree of elasticity and plasticity over a rather wide range of operating temperatures. Previously known sealants have been unsatisfactory in this respect.

The invention provides a means for overcoming the foregoing deficiencies. According to the invention, there is provided within a pneumatic tire casing or inner tube, a layer of sealant material made of Butyl rubber modified by reaction with a small amount of a dimethylol phenol. The pneumatic tire casing in which the sealant layer is incorporated in accordance with the present invention will of course be the tubeless kind of tire. The inner tube in which the sealant is incorporated may be of the ordinary kind, or it may be of the reinforced kind as shown, for example, in U. S. Patent 2,605,200 isued to A. N. Iknayan on July 29, 1952, or it may be a tube of the so-called helical type, as shown in U. S. Patent 2,423,147 issued to D. J. Hinman, on July 1, 1947.

Butyl rubber, as is well known, is a commercial synthetic rubber made by copolymerizing an isoolefin, usually isobutylene, with a minor proportion of a multiolefinic unsaturate having from 4 to 14 carbon atoms per molecule. The isoolefins used generally have from 4 to 7 carbon atoms, and such isomonoolefins as isobutylene or ethyl methyl ethylene are preferred. The multi-olefinic unsaturate used is usually an aliphatic conjugated dioolefin having from 4 to 6 carbon atoms, and is preferably isoprene or butadiene. Other suitable dioolefins that may be mentioned are such compounds as piperylene; 2,3-dimethyl butadiene-1,3; 1,2-dimethyl butadiene-1,3; 1,3-dimethyl butadiene-1,3; 1-ethyl butadiene-1,3; and 1,4-dimethyl butadiene-1,3. The Butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term Butyl rubber.

In carrying out the invention, the Butyl rubber, which is to form the sealant layer, is modified chemically by reacting it with a dimethylol phenol. Reaction products of Butyl rubber and dimethylol phenols and methods of making the same are disclosed and claimed in our copending application Serial No. 290,344, filed May 27, 1952, now Patent No. 2,702,287. The dimethylol phenols are known materials. The dimethylol phenol employed may be essentially a monomeric material, or it may be a polymeric material formed by self-condensation of the dimethylol phenol to yield a heat-reactive, oil-soluble, resinous product. Such resinous polymeric dimethylol phenols are the preferred materials for use in manufacturing the improved puncture sealant from Butyl rubber in accordance with the invention. Mixtures of the resinous polymeric dimethylol phenols with more or less of low molecular weight or monomeric dimethylol phenols are also useful. For convenience, the term dimethylol phenol will be used to refer to any of the monomeric or polymeric compounds, or to mixtures thereof, unless otherwise stated.

To make the sealant material employed in the invention, the desired chemical and physical modifications of the Butyl rubber are brought about by heating the Butyl rubber in admixture with a small amount of the dimethylol phenol. It is preferred to employ from about 0.2 to 2.5 parts of the dimethylol phenol per 100 parts of the Butyl rubber. The Butyl rubber containing the dimethylol phenol is heated to a temperature sufficiently elevated to cause the dimethylol phenol to react with the Butyl rubber. Reaction temperatures of at least about 200° F. are generally employed, although it is preferred to use a somewhat higher reaction temperature, of at least 300° F. If desired, higher temperatures than 300° F. may be employed, up to the point at which the stock would be injured by thermal decomposition (temperatures of the order of 400° F. are likely to injure the Butyl, particularly if such high temperatures are maintained for an appreciable length of time). The heating should be continued until the reaction with the dimethylol phenol is substantially completed. Generally, reaction periods of from about 5 to 45 minutes are sufficient to substantially complete the reaction, depending on the temperature employed. The lower reaction temperatures require the longer reaction time. The chemical reaction between the dimethylol phenol and the Butyl rubber is accompanied by remarkable changes in the physical properties of the Butyl. The Butyl becomes tougher and more nervy, and increases in tensile strength and modulus, as well as in viscosity. It is also observed that during this treatment of the Butyl rubber, an appreciable proportion of gel is formed, that is, an appreciable quantity of the Butyl hydrocarbon is converted to a benzol-insoluble form. The plasticity of the reaction mixture provides a good index of the extent to which the reaction has proceeded, since the plasticity will generally decrease gradually as the reaction proceeds, to a definite substantially minimum value as the dimethylol phenol becomes essentially exhausted. The ultimate value of the plasticity will be determined in a large part by the amount of dimethylol phenol employed, although the plasticity level attained during the process will also frequently be considerably influenced by the presence or absence of other materials. The plasticity of the mix may be measured by the conventional Mooney or Williams tests. However, it is generally more satisfactory, especially from the standpoint of convenience, to employ the plasticity measurement disclosed in the copending application of E. F. Linhorst, Serial No. 277,779, filed March 21, 1952. The Linhorst plasticity measurement is conveniently performed on a sample of the plastic material molded in the form of a small disk or wafer, having, for example a thickness of 0.09 inch and a diameter of 9/16 inch. The sample is sandwiched between two pieces of emery paper, having a diameter, for example, of ⅝ inch, and suitably being 400 grade paper of the waterproof type, with the abrasive side of the paper in contact with the sample. This assembly is placed between two platens ½" in diameter, and subjected to a standard loading force, say 8 pounds, for a definite period of time, say 12 minutes, at a controlled elevated temperature. The temperature is conveniently controlled by disposing the sample and platens within a heated glycerol bath, contained in a Dewar flask, during the test. The thickness of the sample, after a definite loading for a definite time and temperature, as determined with the aid of a dial gauge, is an accurate measure of the plasticity of the stock, and is referred to as the Linhorst plasticity.

The invention will be described in more detail with reference to the accompanying drawings; wherein:

Fig. 1 is a perspective view of a sealant layer of the invention;

Fig. 2 is a transverse sectional elevation showing one method of assembling the sealant layer with an inner tube;

Fig. 3 is a similar view of the completed assembly;

Figs. 4 and 5 are similar fragmentary views showing the action of the sealant when the tube is punctured by a nail;

Figure 6:
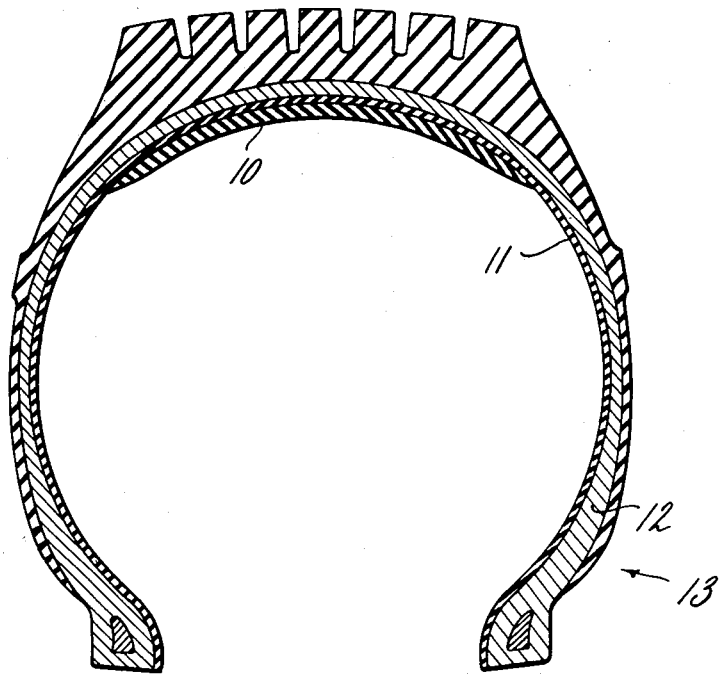
Fig. 6 is a transverse sectional elevation of a tubeless type of pneumatic tire embodying a layer of sealant made in accordance with the invention.

A convenient way to carry out the reaction is to charge the Butyl rubber and the dimethylol phenol to an internal mixer, such as a Banbury mixer, and work the two materials together at elevated temperature. If desired, the Butyl rubber and dimethylol phenol may be reacted while working on an open rubber mill with heated rolls. However, it is not essential to masticate the reaction mixture, and it is sufficient to heat the materials together under static conditions, as in an air oven. Typically we add the dimethylol phenol to the raw Butyl rubber in a Banbury mixer and masticate therein for from 5 to 12 minutes at from 300 to 370° F. Alternatively, in a less preferred method, the raw Butyl and the dimethylol phenol may be mixed together without any particular effort to cause substantial reaction therebetween, and this mixture may be fabricated into a self-sealing inner tube or pneumatic tire in the unvulcanized state, by methods which will be clear from the detailed description given below, reliance being had upon the heat subsequently applied to the tube or tire during vulcanization thereof to effect the desired reaction between the Butyl rubber and the dimethylol phenol. Less desirably, the unreacted mixture of Butyl rubber and dimethylol phenol may be incorporated in a previously vulcanized pneumatic tire casing, which is subsequently subjected to further heating to bring about the necessary reaction between the Butyl and the phenol dialcohol. However, we usually prefer to react the Butyl rubber and the dimethylol phenol, as in a Banbury mixer, in the first instance, and use such reacted material to fabricate the sealant layer. Very important and unusual advantages are attendant upon this procedure, as will be made clear below.

In practising the invention, suitable fillers are incorporated in the puncture-sealing material, preferably at least in part during or before the reaction of the Butyl with the dimethylol phenol. The function of the filler is to reduce the nerve of the composition, since Butyl rubber modified with dimethylol phenol as described is, per se, quite nervy, and too elastic for use as a sealant, unless it is loaded with appreciable amounts of filler capable of suppressing the elastic properties to a substantial extent. When suitably loaded with an appropriate filler, the dimethylol phenol modified Butyl becomes more plastic, and provides a balance of elastic and plastic properties that make this material singularly well suited for use as a sealant. The fillers that may be used for this purpose may be any relatively inert, solid, finely powdered material, such as carbon black, clay, mica, calcium carbonate, precipitated hydrated silica, precipitated hydrated calcium silicate, zinc oxide, diatomaceous earth, wood flour, or similar fillers known in the rubber compounding art. It is also possible to employ iron oxide, such as black magnetic iron oxide, as a filler, but this material has been observed to have a definite inhibiting action upon the reaction between the Butyl and the dimethylol phenol. Therefore, if this material is used, it should not be added to the mix until after the reaction has been substantially completed. Usually a total of from about 40 to 150 parts by weight of such filler material are employed to 100 parts of the Butyl rubber. Calcined clay is a preferred filler. The preferred practice is to have at least a part of the filler present in the initial Butyl rubber reaction mix, so that the stock can be handled more satisfactorily on the mill. Thus, for example, when the initial reaction mix includes a substantial amount of clay, the mix takes the form of a conveniently handled coherent mass as it comes off the mill, and it can be rolled in "pig" form for easy storage, whereas, in the absence of clay or other filler, the mixture is crumbly and is therefore more difficult to handle and store.

It is also preferred to include in the sealant composition suitable softeners or plasticizers, preferably plasticizers of a somewhat sticky nature, to increase the tack of the mixture. The plasticizer should be of the kind that the skilled rubber compounder refers to as non-migratory, that is, in the final assembly, the plasticizer should have a preference for remaining within the sealant layer with which it is compounded, rather than volatilize or diffuse into the material of the adjacent parts of the inner tube or tire. In this way, the properties of the sealant will be substantially maintained over a prolonged period of service life. Mineral oils, rosin oil, or other known plasticizers may be used. Preferred softeners are liquid tacky resinous materials of high molecular weight, such as polybutene (predominantly high molecular weight monoolefins), or synthetic resins such as paracoumarone-indene type. Such materials are well known to the skilled rubber compounder. Generally the plasticizer is added subsequently to the reaction between the Butyl rubber and the dimethylol phenol. When sufficient plasticizer is used to impart workability to the stock, and to leave it in a softened condition, the mixture will be best suited to perform the sealing function described in detail below. Usually from about 10 to 50 parts of softener are sufficient for this purpose. In regard to the use of paracoumarone-indene resin as the plasticizer, it should be mentioned that this material may have a definite retarding effect upon the reaction between the Butyl rubber and the dimethylol phenol, and, if it is used, it should therefore not be added until after the reaction has been carried out.

The following example will illustrate the invention in more detail.

*Example*

The following materials were charged to a Banbury mixer and masticated. After seven minutes of mixing the temperature had reached 300° F., and at the end of 14 minutes the batch was discharged at a temperature of 395° F.

|  | Parts by weight |
|---|---|
| Butyl rubber (GR–I 18) | 100.00 |
| Calcined clay (Whitetex) | 30.00 |
| Amberol ST–137 resin | .75 |

The Amberol ST–137 is a commercially available resinous dimethylol phenol, believed to be a reaction product of formaldehyde and para-octyl phenol, made in an alkaline medium. It is a solid resinous material. As a result of this treatment, the dimethylol phenol was substantially completely reacted.

The following table shows the Linhorst and Williams plasticity values, as well as the Mooney viscosity values, obtained at the conclusion of a series of batches processed in accordance with the foregoing procedure.

| Batch | Linhorst Plasticity [1] | Williams [2] | | Mooney Viscosity [3] |
|---|---|---|---|---|
| | | Plasticity Number | Recovery Value | |
| A | 29.6 | 371 | 53 | 91 |
| B | 28.5 | 339 | 41 | 89 |
| C | 21.5 | 327 | 34 | 88 |
| D | 23.0 | 334 | 43 | 92 |
| E | 30.0 | 399 | 122 | 100 |
| F | 30.0 | 406 | 161 | 97 |
| G | 30.5 | 388 | 124 | 98 |
| Average | 27.5 | 366 | 83 | 94 |

[1] Linhorst plasticity determined by the method of application Serial No. 290,344, filed May 27, 1952, now Patent No. 2,702,287. .075 gauge sample molded for 3 minutes at 212° F. 12 minute reading in ten-thousandths of an inch, with an 8 pound weight at 212° F.
[2] At 212° F.
[3] Large rotor at 212° F.

The following materials were then added to the above intermediate mix in a separate operation.

Parts by weight
Magnetic iron oxide _____ 65.00
Cumar P-10 _____ 10.00
Indopol H-300 _____ 8.0
Stearic acid _____ 1.00

The Cumar P-10 was a synthetic paracoumarone-indene resin, having a softening range of 45 to 61° F. The Indopol H-300 was a form of polybutene, described as being predominantly high molecular weight monolefins (85–90%), the balance being isoparaffins. This material had a mean molecular weight of 940 and a Saybolt Universal viscosity at 210° F. of 3330 seconds. The batch was mixed for 12 minutes in a Banbury and discharged at the end of that period at a temperature of 365° F. The resulting mixture was readily processible in the same manner as the usual rubber compounds, and could be extruded readily. The final mix was appreciably more plastic than the intermediate mix, because of the admixture of softener, as evidenced by the final plasticity and viscosity values of the series of batches:

| Batch | Linhorst Plasticity | Williams | | Mooney Viscosity |
|---|---|---|---|---|
| | | Plasticity Number | Recovery Value | |
| A | 13.5 | 277 | 15 | 42 |
| B | 17.0 | 269 | 13 | 58 |
| C | 17.0 | 269 | 6 | 59 |
| D | 19.5 | 326 | 55 | 69 |
| E | 20.0 | 325 | 56 | 66 |
| F | 20.5 | 329 | 58 | 67 |
| G | 20.5 | 328 | 57 | 70 |
| Average | 18.3 | 303 | 37 | 62 |

The foregoing mixture was extruded to form a strip 1 of sealant material, as shown in Fig. 1 of the drawing, having a greater thickness at its center 2, than at either of its sides 3, which were gradually tapered. There was then provided, as shown in Fig. 2, an inner tube 4 constructed similarly to an ordinary conventional inner tube, and made of vulcanized rubber. The upper or crown surface 5 of the inner tube 4 was buffed and coated with a suitable adhesive, and a suitable length of the sealant layer 1 was then cemented onto the surface 5 of the tube 4. A sheet of vulcanizable rubber 6 was then cemented over the outer surface of the sealant layer 1, to produce a construction in which the sealant layer is enclosed between the outer crown surface of the inner tube and the applied sheet of rubber, as shown in Fig. 3. Alternatively, the sealant layer 1 may be extruded hot directly onto the cover strip 6, in which case it is not necessary to cement the cover strip to the sealant layer. The entire assembly is thereafter subjected to cure in an inner tube mold.

The action of the sealant layer is such that when the inner tube is accidentally pierced by a nail 7 or other object, as indicated in Fig. 4, and the nail is subsequently withdrawn, the sealant is pulled or drawn out through the opening 8 (Fig. 5) in the form of a small plug or knob 9, that effectively seals the opening against loss of air from the inner tube.

In Fig. 6, a sealant layer 10 formulated of a reaction product of Butyl rubber and dimethylol phenol in accordance with the invention is shown adhered to the interior crown surface of a layer 11 of air-impervious stock covering the interior surface of a carcass 12 of a tubeless type of tire 13.

It will be apparent that, in general, the invention provides a tire or tube including an annular air-impervious envelope having, at least over its tread or crown region, a layer of the sealant material that preferably is relatively thickened at its center and gradually tapers off toward each sidewall of the assembly. Of course, the sealant may be continued down along each of the sidewalls of the assembly, but this is not generally necessary or desirable.

Tires and tubes containing a sealant layer made up of Butyl rubber modified by chemical reaction with a dimethylol phenol as described have proven to be remarkably effective and singularly free from the various disadvantages of prior puncture-sealing constructions. The dimethylol phenol modified Butyl resists plastic flow, even under the influence of the extreme centrifugal forces and heat developed at high speeds. Thus, when an inner tube constructed as described was run in a casing for 4 hours on a test wheel at a speed equivalent to 60 miles per hour, there was no observable plastic flow and the tube retained good static balance. In contrast to this, a conventional sealant structure subjected to this test underwent plastic flow to the extent that the sealant collected together at the extreme crown of the tire, leaving the lateral portions of the tread area unprotected and throwing the tube out of balance. At the same time, the plastic sealant of the invention has sufficient tack and plasticity to form a plug following removal of a piercing object.

The sealant means of the invention also possesses elasticity to a most desirable extent. The sealant therefore withstands the continual intense working and rapid flexing to which it is subjected as the tire revolves. The sealant is therefore relatively stable against movement due to the centrifugal forces developed when running, so that no special restraining elements need be added to keep the sealant material in place. This permits maximum sealing efficiency with substantially less material than might otherwise be required. The resulting decreased thickness in the crown area of the assembly is conducive to lessened tendency to overheat.

The unique combination of the desired degree of elasticity and plasticity exhibited by the present sealant represents a union of physical properties that have heretofore been regarded as mutually exclusive. Furthermore, these properties are retained to the desired degree over a wide range of operating temperatures; e. g. 100–200° F. This in itself is believed to be an entirely new type of behavior.

In order to test the efficiency of a puncture-sealing inner tube constructed according to the invention, the tube was mounted in a tire and run on a cleated test wheel under full load and inflation at a speed equivalent to 30 miles per hour according to the following schedule:

1. Run 30 minutes.
2. Puncture tire and tube with a 6d nail, and run for 15 minutes with the nail in place.
3. Remove nail, run 30 minutes.
4. Puncture with a 16d nail, run 15 minutes.
5. Remove nail, run 30 minutes.
6. Puncture with two 6d nails, run 15 minutes.

7. Remove nails, run 30 minutes.
8. Puncture with two 16d nails, run 15 minutes.
9. Remove nails, run 30 minutes.

The inflation of the tire was observed after each of the foregoing periods, to determine how well the tube was holding the air under this abusive treatment. Subsequently the inflation was observed every one-half hour for a period of 24 hours, following which the tire was reinflated to its original pressure and run for 4 hours. It was observed that when the dimethylol phenol modified Butyl rubber was employed as the sealant material in accordance with the invention, the inner tube had sufficient air-retaining capacity even in the latter stages of this severe test. In contrast to this, previously known sealant structures generally failed in the very early stages of the test, for instance, at step 2 or 4 above, by developing serious leaks that permitted most of the air to escape.

As indicated previously, the preferred dimethylol phenols for use in the invention are the polymeric dimethylol phenols. These are well known resinous materials, frequently used in making varnishes and the like. They are generally solids and are therefore more convenient to handle than the monomeric dimethylol phenols, which are freqeuntly liquids in the crude form, and tend to be malodorous and lachrymatory. The resinous dimethylol phenols are also more effective in producing the desired physical properties in the Butyl.

As will be understood by those skilled in the art, the dimethylol phenols are typically made by reacting a para-substituted phenol having the two ortho positions unoccupied with a considerable molar excess of formaldehyde, the molar ratio of formaldehyde to phenol typically being 2:1, in the presence of a strong alkaline catalyst, especially an alkali metal hydroxide, which is subsequently neutralized. Typically the mixture of the phenol, formaldehyde and alkaline catalyst is heated at a suitable temperature, e. g. 25–100° C., the first stage of the reaction involving formation of the phenol methylol, i. e., the para-substituted-2,6-dimethylol phenol. This material, which is a phenol dialcohol, can be isolated by acidification of the mixture and separation of the oily layer which can then be advanced to higher molecular weight form by heating at say 75–175° C. This higher molecular weight form is oil-soluble and heat-reactive, and has the advantages that it is more reactive with the Butyl rubber than the lower molecular weight form. Separation of the phenol dialcohol can be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state.

The phenol from which the dimethylol phenol is made generally has a hydrocarbon group in the position para to the phenolic hydroxyl, examples being alkyl groups, especially alkyl groups having from 3 to 20 carbon atoms, tertiary-butyl and tertiary-octyl (alpha,alpha,gamma,gamma-tetramethyl butyl) being especially preferred, cycloalkyl groups, aryl groups such as phenyl, and aralkyl groups such as benzyl and cumyl. We believe that the tertiary-butyl and the aforementioned branched octyl are outstanding. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-(alpha,alpha-dimethyl benzyl) phenol
2,6-dimethylol-4-cyclohexyl phenol As indicated previously, the amount of dimethylol phenol employed is generally from 0.2 to 2.5 parts per 100 parts of Butyl rubber. It may happen that the Butyl rubber will contain certain materials, incorporated therein by the manufacturer, that appear to have a definite retarding action on the reaction between the Butyl and the dimethylol phenol. Certain amines used as stabilizing anti-oxidants, especially phenyl beta-naphthylamine, metallic soaps such as zinc stearate, and free fatty acids such as stearic acid are believed to exert a retarding action, and such retarding action is most pronounced when the amount of dimethylol phenol is relatively small, say from 0.2 to 1 part. Therefore, when such retarders are present in substantial amounts we prefer to employ amounts of dimethylol phenol within the upper part of the recommended range, for example from 1.5 to 2.5 parts, and in this way we have found it possible to compensate for such retarding effect.

Reference has been made to the characteristic decrease in the plasticity of the Butyl rubber as a result of reaction with the dimethylol phenol. As a general rule, it may be stated that, when compounded as recommended, the sealant body of the invention will preferably have a Linhorst plasticity of about 18, and will usually fall within the range of from about 13 to about 30. This range represents not only the desirable condition of processability, but also provides the unique and highly effective sealing behavior described above. In terms of Mooney viscosity, the preferred value might be stated to be about 60, while the useful range might be stated to be between about 40 and 70. Since these values represent the plasticity of the final mix, including the softener, it will be understood that when the reaction between the Butyl rubber and the dimethylol phenol is carried out in the absence of the plasticizer, as in the preferred procedure of the working example above, the plasticity number will be correspondingly higher, as pointed out in connection with the example. Thus, with no softener present and only a portion of the filler, a suitable range for the Linhorst plasticity of the dimethylol phenol-Butyl reaction product will be from about 20 to 35, or of the order of roughly 85 to 100 in terms of Mooney viscosity.

Figure 7:
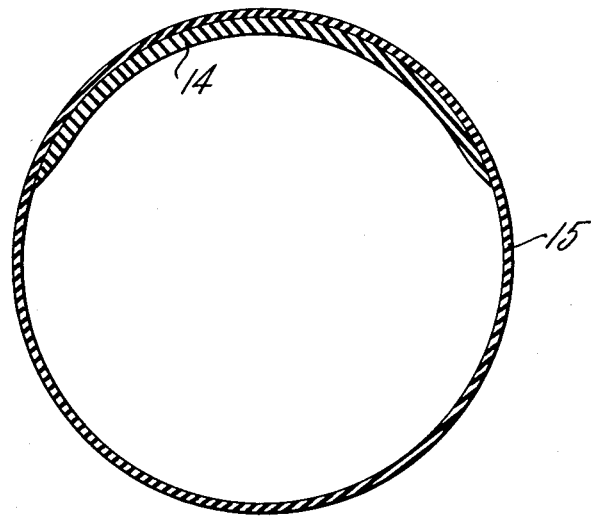
Fig. 7 is a transverse sectional elevation of a modified form of tube embodying the sealant layer of the invention.

The inner tube may also take the form shown in Fig. 7, wherein a layer 14 of the sealant is applied to the interior crown surface of a tube 15 without an enclosing member. If desired, the puncture sealant material may be applied to the tube in the unvulcanized state, with the Butyl rubber and the dimethylol phenol still unreacted. Thereafter, the assembly may be vulcanized by heating, such heating serving also to bring about the reaction between the Butyl rubber and the dimethylol phenol. In this case, the time and temperature of vulcanization should be sufficient to substantially complete the reaction between the Butyl and dimethylol phenol. The sealant should also of course be free from materials that inhibit the desired reaction, such as iron oxide and paracoumarone-indene resin. Thus, the filler used may be clay and the plasticizer used may be polybutene.

It will be understood that the reaction product of Butyl rubber and dimethylol phenol used in this invention is still basically uncured or unvulcanized Butyl, that is, it is readily processable like a raw stock and it is still susceptible to sulfur vulcanization. However, for purposes of this invention it is, of course, not desired to vulcanize the Butyl reaction product; otherwise the reaction product would lose entirely the unique set of physical properties that makes it admirably adapted to perform the puncture-sealing function described. One major advantage of the employment of a pre-reacted combination of Butyl rubber and dimethylol phenol in accordance with the invention is that once the reaction between the Butyl and the dimethylol phenol has been carried out to the extent described, there is substantially no tendency for the physical properties of the reaction product to be altered significantly under the influence of the heat subsequently applied to the assembly during vulcanization. Therefore, having provided the Butyl with the desired degree of elasticity and plasticity, these properties are retained even after vulcanization of the remainder of the assembly, and even after indefinite periods of service.

The preferred method of making the puncture-sealing article of the invention, involving pre-reacting the Butyl rubber and dimethylol phenol in an initial reaction mix, followed by incorporation of other materials to make a second mix which is incorporated in the tube or tire, has the important advantage of affording an opportunity to incorporate in the final sealant compound materials which have an inhibiting or retarding action on sulfur vulcanization. The significance of this is that it makes it possible to render the reacted sealant substantially immune to gradual hardening which could otherwise take place as a result of migration or diffusion of residual curatives from the adjoining sulfur-vulcanized portions of the tire or tube. It will be understood that the portions of the tire or tube adjacent to and in contact with the sealant layer will be compounded for sulfur vulcanization with conventional accelerators etc. Such stocks ordinarily contain residual materials having curative action that diffuse into adjacent rubber areas and are capable of causing gradual further cure, with consequent hardening. Such gradual hardening of the sealant in conventionally made assemblies, with consequent loss of ability to perform the sealing function, has been a major disadvantage of the prior art methods and has in large part been a factor in preventing the development of a fully acceptable self-sealing tube or tire, that would remain satisfactory through indefinite periods of service. The paracoumarone-indene resin that was mixed with the pre-reacted Butyl as a plasticizer in the working example given above is an example of such an inhibiting material, since it exerts a pronounced retarding action on the sulfur cure of Butyl. Its presence in the final sealant mixture therefore insures that the sealant will not become undesirably hard as a result of migration of sulfur from the tube or tire into the sealant layer. In place of the paracoumarone resin, there could be incorporated in the final sealant mixture small amounts of any other suitable substances known to the skilled rubber compounder as retarders of vulcanization. In general, acidic substances of various kinds are known to be retarders, and may be used for this purpose. Among the known retarders may be mentioned salicylic acid, benzoic acid, zinc chloride, and the like. Numerous retarders are known to the art, and, since they vary considerably with respect to the degree of their retarding action, no definite general statement as to the exact quantity of retarder to be used can be made, having in mind the great variety of retarders available. However, it will be sufficient for purposes of the invention to add enough retarder to the final sealant to substantially inhibit sulfur vulcanization, and the experienced rubber compounder will have no difficulty in selecting a suitable quantity of a given retarder. By way of non-limiting example, it may be stated that from about 2 to 5 parts of salicylic acid, per 100 parts of Butyl rubber, exerts a pronounced retarding effect.

Having thus described our invention, what we claim and desire to protect by Letters Patent is:

1. A puncture-sealing pneumatic article for supporting a vehicle comprising an annular air-impervious envelope having a crown portion and sidewall portions, and a layer of sealant material adhered at least to said crown portion made up of a reaction product of (1) a synthetic rubbery copolymer of isobutylene with from 0.5 to 5% of isoprene and (2) from 0.2 to 2.5 parts by weight of a resinous 2,6-dimethylol-4-lower alkyl phenol, per 100 parts of said rubbery copolymer, in admixture with from 40 to 150 parts of a powdered filler, and from 10 to 50 parts of a softener, the said composition having a Mooney viscosity of from 40 to 70.

2. A puncture-sealing pneumatic article for supporting a vehicle comprising an annular air-impervious envelope of sulfur vulcanized rubber containing residual curative and having a crown portion and sidewall portions, and a layer of sealant material adhered at least to said crown portion made up of a reaction product of (1) a synthetic rubbery copolymer of an isoolefin having from 4 to 7 carbon atoms with from 0.5 to 10% of an aliphatic conjugated diolefin having from 4 to 6 carbon atoms and (2) from 0.2 to 2.5 parts by weight of a 2,6-dimethylol-4-hydrocarbon phenol, per 100 parts of said rubbery copolymer, the said sealant having a Mooney viscosity of from 40 to 70, and containing from 40 to 150 parts of a powdered filler, from 10 to 50 parts of a softener, and a retarder of sulfur vulcanization in amount sufficient to prevent hardening of said sealant by said residual curative diffusing from said rubber envelope into the sealant the said hydrocarbon being selected from the group consisting of alkyl, cycloalkyl, aryl and aralkyl radicals.

References Cited in the file of this patent

UNITED STATES PATENTS

| | | |
|---|---|---|
| 1,273,698 | Reuter | Aug. 21, 1917 |
| 2,332,913 | Iknayan | Oct. 26, 1943 |
| 2,356,128 | Thomas | Aug. 22, 1944 |
| 2,493,047 | Waber | Jan. 3, 1950 |
| 2,566,384 | Tilton | Sept. 4, 1951 |
| 2,598,289 | Newman | May 27, 1952 |
| 2,605,248 | Fisk | July 29, 1952 |
| 2,632,492 | Placentino | Mar. 24, 1953 |
| 2,649,431 | Little | Aug. 18, 1953 |
| 2,649,432 | Little | Aug. 18, 1953 |
| 2,657,729 | Hardman et al. | Nov. 3, 1953 |
| 2,702,287 | Iknayan et al. | Feb. 15, 1955 |

OTHER REFERENCES

Ser. No. 357,662, Wilschut (A. P. C.), published Apr. 20, 1943.

Rubber Age, "Use of the Amberols in Synthetic Rubber Stocks," January 1947, page 449.